United States Patent [19]

Tanaka et al.

[11] Patent Number: 5,180,118
[45] Date of Patent: Jan. 19, 1993

[54] MAGNETIC TAPE CASSETTES

[75] Inventors: Kimio Tanaka; Shinichi Sato; Takateru Satoh, all of Saku; Haruo Shiba, Komoro, all of Japan

[73] Assignee: TDK Corporation, Japan

[21] Appl. No.: 482,087

[22] Filed: Feb. 20, 1990

[30] Foreign Application Priority Data

Feb. 20, 1989 [JP] Japan .................................. 1-17890[U]
Feb. 20, 1989 [JP] Japan .................................. 1-17891[U]
Feb. 20, 1989 [JP] Japan .................................. 1-17892[U]
Feb. 20, 1989 [JP] Japan .................................. 1-17893[U]
Feb. 20, 1989 [JP] Japan ...................................... 1-38458

[51] Int. Cl.$^5$ ........................................... G11B 23/04
[52] U.S. Cl. .................................................... 242/199
[58] Field of Search ............................... 242/197–200; 360/132

[56] References Cited

U.S. PATENT DOCUMENTS

| 4,754,938 | 7/1988 | Satoh | 242/199 |
| 4,767,007 | 8/1988 | Oishi et al. | 360/132 X |
| 4,809,928 | 3/1989 | Hoffrichter et al. | 242/199 |
| 4,875,584 | 10/1989 | Ackeret | 206/387 |
| 4,892,266 | 1/1990 | Tanaka et al. | 242/199 |
| 4,965,690 | 10/1990 | Tanaka et al. | 360/132 |

FOREIGN PATENT DOCUMENTS

| 0243877 | 11/1987 | European Pat. Off. | 360/132 |
| 3604261 | 8/1986 | Fed. Rep. of Germany | 360/132 |
| 59-33680 | 2/1984 | Japan | 360/132 |
| 59-124073 | 7/1984 | Japan | 360/132 |
| 1-146179 | 6/1989 | Japan | 360/132 |

Primary Examiner—Daniel P. Stodola
Assistant Examiner—William G. Battista, Jr.
Attorney, Agent, or Firm—Wood, Phillips, VanSanten, Hoffman & Ertel

[57] ABSTRACT

A magnetic tape cassette housing is divided into a major part and a rear frame member attached to the rear end of the major part. The major part is divided into a pair of side frame members which are formed of a material of low friction coefficient and a main body surrounded and held together by the side frame members and rear frame member. The housing is of double-layer structure consisting of inside and outside layers. The inside layers are formed with steps along the edges of the side frame members and the rear frame member, and the outside layers are so formed as to fall onto the steps and extend inwardly of the edges of the side frame members. The main body and side frame members are formed with mutually engageable, temporary fasteners. The outer surface of the outside layer is satin crape finished and at least the interface between the inside and outside layers mirror finished.

3 Claims, 19 Drawing Sheets

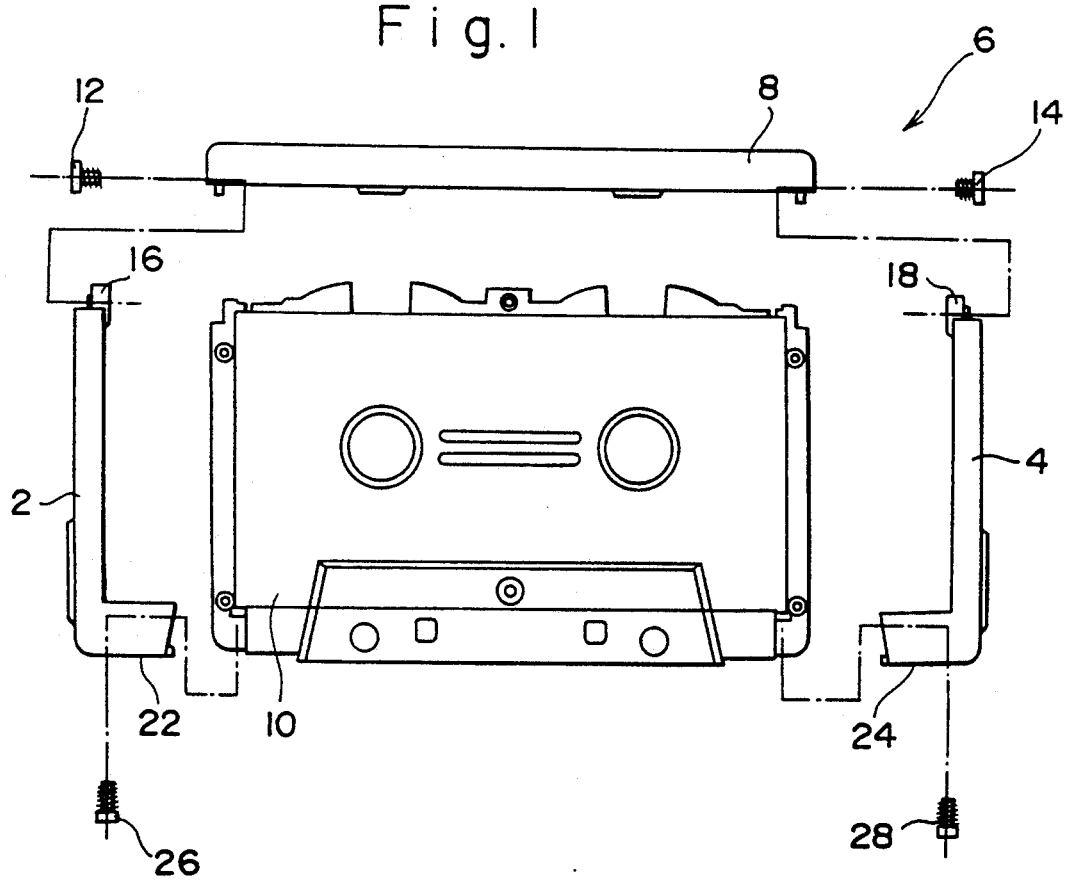

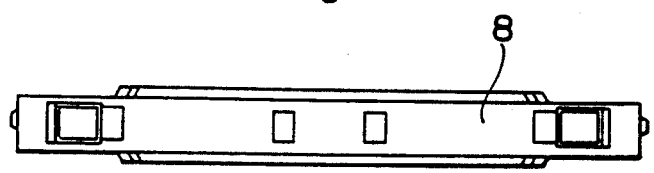
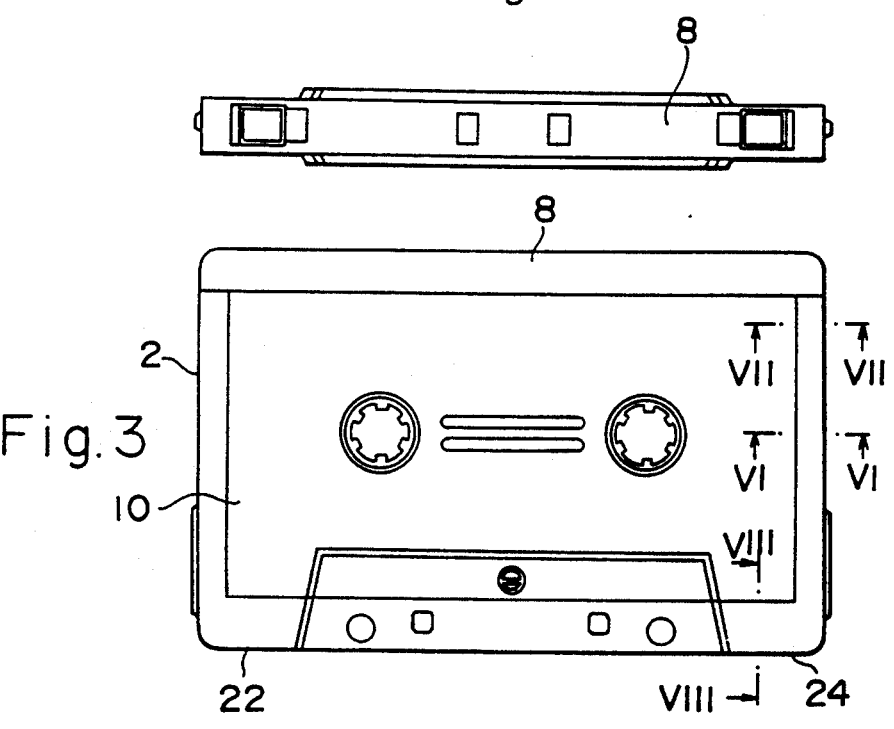
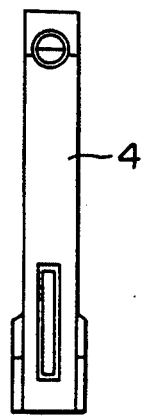
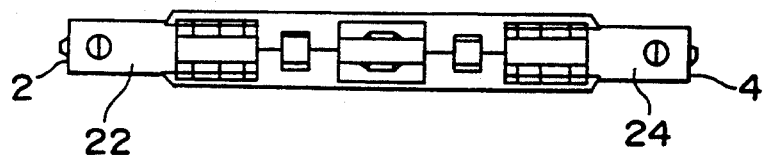

Fig.15
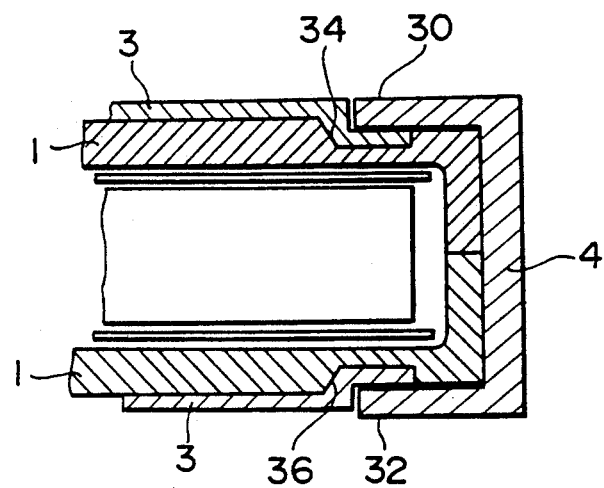
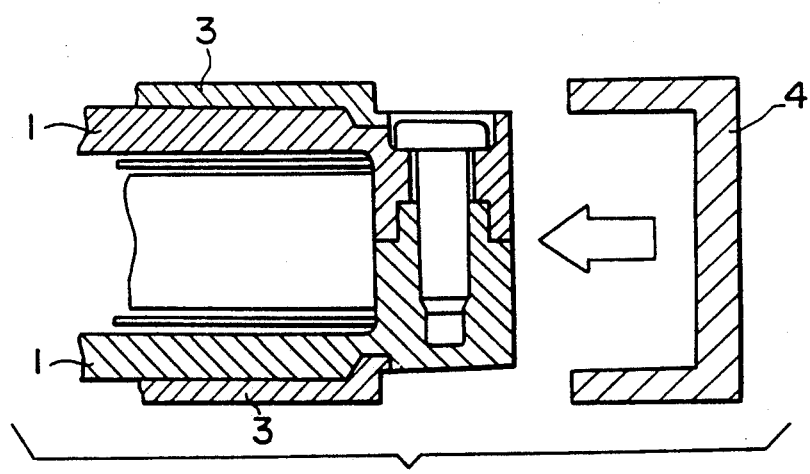
Fig.16

Fig. 28
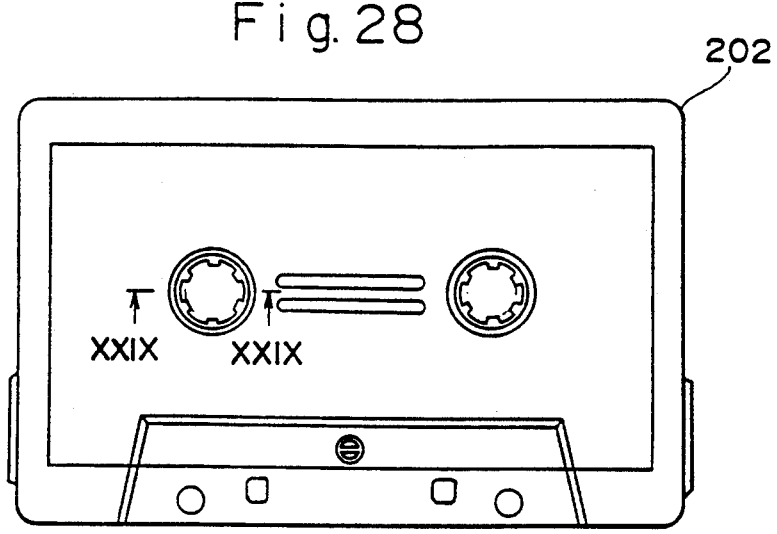
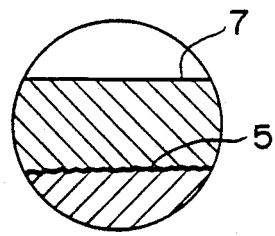
Fig. 29a
Fig. 29
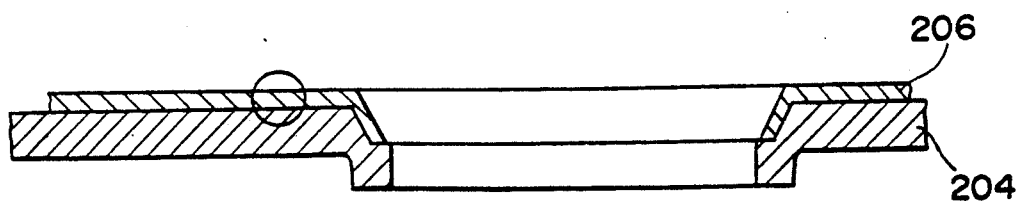

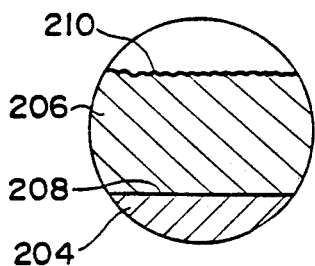
Fig.30a Prior Art
Fig.30 Prior Art
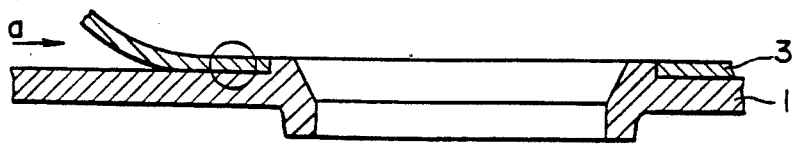
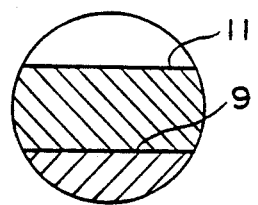
Fig.31a Prior Art
Fig.31 Prior Art
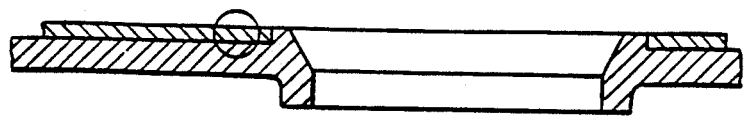

MAGNETIC TAPE CASSETTES

BACKGROUND OF THE INVENTION

This invention relates to magnetic tape cassettes, and more specifically to structures of magnetic tape cassettes.

Ordinarily, magnetic tape cassettes have tape kind detecting openings formed in the rear portion. In the injection molding of tape cassettes, therefore, it is necessary to use specially designed molds to produce cassettes suited for the individual types of tapes to be contained, adding to the cost of manufacture. In an effort to overcome this difficulty, we previously devised a magnetic tape cassette which, as illustrated in FIGS. 11 and 12, has a rear portion of the cassette housing as an independent rear frame member 8 separable from the main body 10. The device is covered by our copending U.S. Pat. No. 4,892,266, said application being incorporated by reference into the present application.

The construction of the magnetic tape cassette disclosed in the above patent application is effective in reducing the manufacturing cost in job-shop type production. However, the recent tendency is toward diversification of the structural material to impart more varied colors, feels, and textures to magnetic tape cassettes. For example, we previously advocated the adoption of a double-layer structure for the upper and lower half housing sections that contain tape-holding components of a cassette, in our copending U.S Pat. No. 4,965,690 which application is incorporated by reference into the present application.

If the outside layer of the double-layer structure is made of a material with a high coefficient of friction, such as n elastomer, the side portions of the resulting magnetic tape cassette that come in direct contact with the holder of a recording-reproducing device when the cassette is loaded into the device naturally have surfaces of the same high-friction-coefficient material. This can reduce the smoothness with which the tape cassette is taken out and impair the rigidity of the cassette itself, adversely affecting the dimensional accuracy of its half housing sections. For this reason the trend to changes in structural material has its limitations.

Another magnetic tape cassette of the prior art has upper and lower half housing sections of double-layer structure made by two-color molding, each section consisting of an inside layer of a rigid material and a relatively flexible, high-friction coefficient outside layer such as of an elastomer, As shown in FIG. 10, the both housing section are molded with the outside layers 3 simply fitted in corresponding recesses 5 formed in the inside layers 1. Consequently, fins 3' left by pouring gates (not shown) used in molding the outside layers and also formed of the outside layer material are exposed, marring the appearance of the resulting cassette. Furthermore, because the outside layer are joined to the inside layers merely by bonding force, they tend to come off easily upon subjection to forces exerted on the surface.

In two-color molding, it is common that, as shown in FIGS. 30 and 30A, and primary molding side of the interface between the inside layer 1 and the outside layer 3, i.e., the outer surface of the inside layer 1, has a satin crape finish 5, whereas the outer surface of the outside layer 3 has a mirror finish 7. This interfacial structure is designed for increased bond strength through more intimate engagement of the inside and outside layers 1, 3. Nevertheless, the structure sometimes causes the outside layer 3 to come off partly from the inside layer 1, as indicated by an arrow a in FIG. 30, at the time the half housing section is taken out, following the injection molding of the outside layer 3, from the outside layer-forming mold (not shown). The peeling is ascribable to the fact that the interfacial adherence of the interface between the mirror surface 7 and the corresponding surface of the mold is greater than that of the satin crape interface between the inside and outside layers. The only step thus far taken to preclude the phenomenon has been, as illustrated in FIGS. 31 and 31A for reference, to mirror finish the outer surface 9 of the inside layer to increase the interfacial adherence between the inside and outside layers. The outer surface of the outside layer is left mirror smooth as indicated at 11. With the interfacial adherence between the mating surfaces of the mold and the outside layer, no such countermeasure as above has been taken to prevent the partial separation of the inside and outside layers.

Still another magnetic tape cassette of the prior art, as indicated in FIGS. 37, 38, and 39, have a pair of hub openings 19 formed through the upper and lower half housing sections. At least one of the two housing sections has a tape-view window member 15 formed generally in the center. In so-called two-color molding whereby the upper and lower half housing sections are made of a double-layer structure, it has been customary, as shown in FIG. 38, to form each hub opening 19, inclusive of the surrounding tapered rim 21, solely of the inside layer 1. The outside layer 3 is so formed as to surround an annular raised rim 13 of the inside layer 1. Structurally, the same applies to the window. As FIG. 39 shows, the inside layer 1 is raised as at 17 to surround the window member 15, e.g., of clear plastic material, and the outside layer 3 is so formed as to surround the raised rim 17. The structure is required to prevent the peeling of the outside layer 3 from around the window member upon application of external forces. The structure naturally exposes a large area of the inside layer 1 to the surface of the cassette as viewed in FIG. 37. If, for example, the outside layer 3 is satin crape finished, its design integrity with the outside layer material is impaired. The structure thus has its limitation in respect of design.

Therefore, it is an object of the present invention to provide a magnetic tape cassette with high flexibility in changing color, feel and texture with different structural materials for the fabrication of upper and lower half housing sections thereof.

Another object of the invention is to provide a magnetic tape cassette which ensures smooth releasability from recording-reproducing devices in which it is loaded, irrespective of the structural materials used in upper and lower half housing sections.

Another object of the invention is to provide a magnetic tape cassette capable of maintaining high rigidity of half housing sections regardless of the structural materials used in the sections.

Still another object of the invention is to provide a magnetic tape cassette having separable side frame members of a low coefficient of friction.

Yet another object of the invention is to provide a magnetic tape cassette in which the remains of pouring gates and fins formed at the time of molding of the outside layer material are not exposed on the outer surface of the outside layer in each of upper and lower half housing sections having a double layer structure of inside and outside layers.

A further object of the invention is to provide a magnetic tape cassette having upper and lower half housing sections of a double-layer structure consisting of inside and outside layers, in which the outside layer is difficult to peel off from the inside layer.

Still a further object of the invention is to facilitate assembling of a magnetic tape cassette by providing mutually engageable, temporary fastening means at points where side frame members and main body are joined using tapping screws.

An even further object of the invention is to further facilitate assembling of a magnetic tape cassette by providing mutually engageable, temporary fastening means not only at points where side frame members and main body are joined by tapping screws but also at points where the side frame members and a rear frame member are joined likewise.

An additional object of the invention is to eliminate the possibility of inside and outside layer separation along the interface at the time of release from the mold, by reducing the interfacial adherence between the mating surfaces of the outside layer-forming mold and the outside layer.

Another additional object of the invention is to provide a magnetic tape cassette in which, even if half housing sections thereof have a double-layer structure, the exposed portions of the inside layer around hub openings and tape-view windows are made inconspicuous lest it mar the design integrity of the outside layer material.

SUMMARY OF THE INVENTION

According to one aspect of the present invention, a magnetic tape cassette is provided which includes hubs on which a length of magnetic tape is wound and which are contained in the space between upper and lower half housing sections, guide rollers and tape guides installed in the front part of the housing to guide the magnetic tape, and a rear part of the housing having safety lug openings and tape type detecting openings, the part having the lug openings and detecting openings being made separable as a rear frame member from the rest of the cassette, characterized in that the rest of the cassette is divided into a pair of side frame members which are formed of a material of low friction coefficient and capable of directly coming into contact with the holder and the like of a recording-reproducing device, and a main body surrounded by and held together with said side frame members and said rear frame member.

In this magnetic tape cassette of the invention, the side wall portions of the magnetic tape cassette that come in direct contact with and are held by the tape holder of a recording-reproducing device are made of a pair of side frame members formed independently of the main body. Thus, the side frame members may be made of a material with a low coefficient of friction, while the main body is built of a high friction coefficient material such as an elastomer, to ensure smooth release of the magnetic tape cassette from the holder.

The side frame members may also be made of a high rigidity material t maintain adequate rigidity of the magnetic tape cassette as a whole, even when the main body is fabricated from a flexible material such as an elastomer. The cassette of the invention thus achieves a functional effect of better flexibility in design than the prior art products.

The construction described above satisfies the both requirements for ensuring smooth loading and unloading of the magnetic tape cassette into and from recording-reproducing devices and diversifying the structural materials of the tape cassette without impairing the rigidity of the cassette itself.

In another aspect of the invention, a magnetic tape cassette which includes the aforementioned components is characterized in that steps are formed in the inner layers of the half housing sections along the edges of the side frame members and the rear frame member, and the outside layers are so formed as to fall onto the steps and extend inwardly of the edges of the side frame members.

In the magnetic tape cassette of the invention, where the upper and lower half housing sections are made of a double-layer structure consisting of inside and outside layers, there is no possibility of exposure of the remains of pouring gates used in injecting outside layer material or fins formed by the molding of the outside layer material. Accordingly, the outward appearance of the magnetic tape cassette is improved.

Moreover, in the magnetic tape cassette of the invention, the outside layers are additionally held in place by the side frame members. They, therefore, are more resistant to curling or peeling away from the respective inside layers than the counterparts in conventional products.

According to the third aspect of the invention, a magnetic tape cassette is provided which comprises a main body made up of upper and lower half housing sections, a pair of side frame members capable of coming in direct contact with the holder and the like of recording-reproducing devices and secured to the main body by first fixing means, and a rear frame member having safety lug openings and tape type detecting openings and which is secured to the side frame members and main body by second fixing means by second fixing means. The first and second fixing means may be tapping screws, and mutually engageable, temporary fastening means may consist of protuberances formed on either the main body or side frame members and slots formed in either the main body or side frame members where the protuberances are not formed, said slots being so shaped as to receive said protuberances.

In the magnetic tape cassette of the invention, the side frame members are temporarily secured to the main body by simply pressing the members against given portions of the main body. This facilitates the assembling involving fastening of the side frame members to the main body by tapping screws. The assembling is even more facilitated by the provision of similar temporary fastening means at points corresponding to the second fixing means on the side frame members and rear frame member.

According to the fourth aspect of the invention, a magnetic tape cassette including upper and lower half housing sections each consisting of an inside layer and an outside layer molded integrally over the outer surface of the inside layer is provided, which is characterized in that the outer surface of the outside layer is stain crape finished and at least the interface between the inside and outside layers is mirror finished. In the tape cassette of the invention, the satin finish on the outer surface of the outside layer is produced by a satin crape pattern formed on the corresponding surface of the outside layer forming mold with a surface roughness of from 0.5 to 50 microns Rz, preferably 3 microns Rz or more, while the interface between the inside and outside layers are mirror finished with a surface roughness of one micron Rz, preferably 0.5 micron Rz or less.

In the tape cassette of the invention with the foregoing construction, the adherence in the interface between the surface of the outside layer-forming mold and the corresponding surface of the outside layer so produced is less than when the both surfaces are mirror finished. This produces the functional effect of preventing the aforesaid interfacial separation of the inside and outside layers.

According to the fifth aspect of the invention, a magnetic tape cassette is provided which includes a pair of hubs on which a length of magnetic tape is wound and contained between upper and lower half housing sections, said housing sections being formed with hub openings each having outer tapered rim and a center hole to receive a hub, said half housing sections being of a double-layer structure consisting integrally of inside and outside layers, characterized in that the region surrounding each hub opening consists of an inside layer portion having a tapered rim parallel to the outer tapered rim and an annular planar rim formed between the center hole and the tapered rim and an outside layer portion which extends downwardly along the tapered rim and the annular planar rim of the inside layer, leaving an annular offset exposed close to the center hole, and that the interface between the inside and outside layers in the region surrounding each hub opening is mirror finished, whereas the surface of the annular offset exposed around the center hold of the hub opening is satin crape finished.

In the magnetic tape cassette of the invention, the rim portions of openings of the outside layer around tape-view windows recede relative to the rims of openings of the inside layer, and the inside layer portions thereby exposed serve as offsets to prevent finning of the outside layer. The exposed surface of the offsets in satin crape finished. The surface of the inside layer that comes in contact with the outside layer, except for the offsets around the tap-view windows, is mirror finished.

In the magnetic tape cassette of the invention, the outside layer is extended into hub openings along their tapered rims and the offsets are satin crape finished. This enhances the surface structural integrity of the outside layer and improves the outward appearance of the magnetic tape cassette.

BRIEF DESCRIPTION OF THE DRAWINGS

FIG. 1 is an exploded plan view of the first embodiment of magnetic tape cassette of the invention;

FIG. 2 is a rear view of the same cassette as assembled;

FIG. 3 is a plan view of the same cassette;

FIG. 4 is a side view of the same cassette;

FIG. 5 is a front view of the same cassette;

FIG. 15 is a fragmentary sectional view taken along the line XV—XV of FIG. 13;

FIG. 16 is a fragmentary sectional view taken along the line XVI—XVI of FIG. 13;

FIG. 28 is a plan view of the fourth embodiment of magnetic tape cassette of the invention;

FIG. 29 is a fragmentary sectional view taken along the line XXIX—XXIX of FIG. 28;

FIG. 29a is an enlarged view of the circled portion of the magnetic tape cassette of FIG. 29;

FIG. 30 is a fragmentary sectional view similar to FIG. 29 but of a conventional tape cassette;

FIG. 30a is an enlarged view of the circled potion of the tape cassette of FIG. 30;

FIG. 31 is a fragmentary sectional view similar to FIG. 29 but of a conventional tape cassette whose outside layer is molded to have a mirror surface on both inner and outer sides;

FIG. 31a is an enlarged view of the circled portion of the tape cassette of FIG. 31;

DESCRIPTION OF THE PREFERRED EMBODIMENTS

Figure 6:
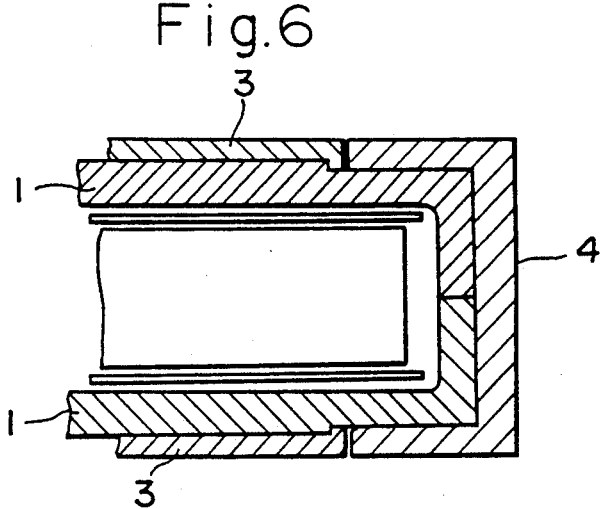
FIG. 6 is a fragmentary sectional view taken along the line VI—VI of FIG. 3.
Figure 7:
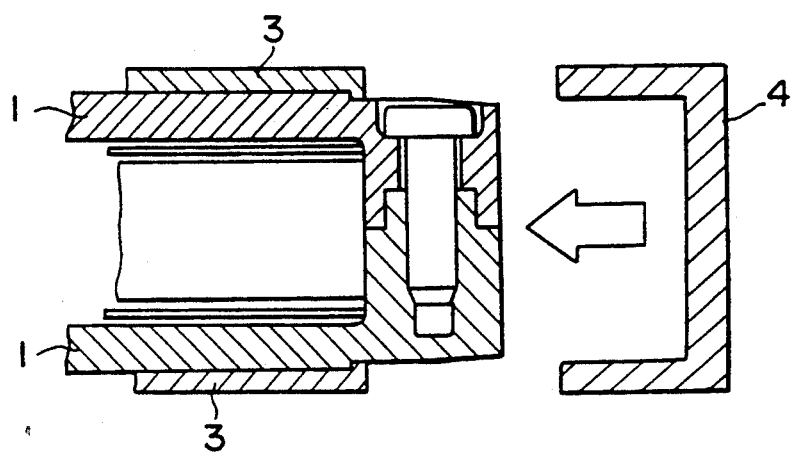
FIG. 7 is a fragmentary sectional view taken along the line VII—VII of FIG. 3.
Figure 8:
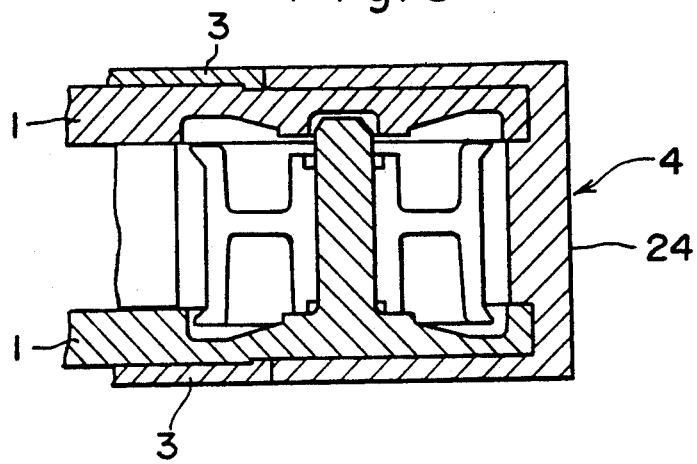
FIG. 8 is a fragmentary sectional view taken along the line VIII—VIII of FIG. 3.
Figure 9:
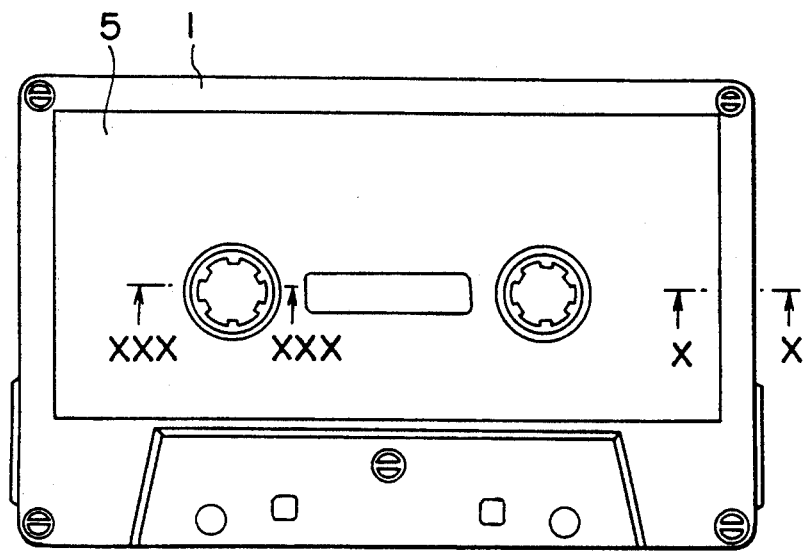
FIG. 9 is a plan view of a conventional magnetic tape cassette.
Figure 10:
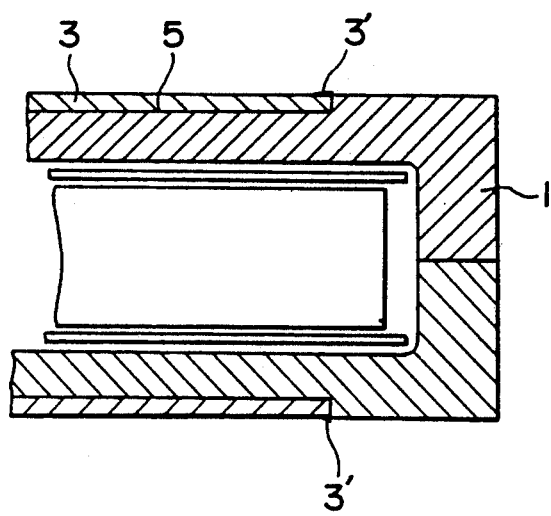
FIG. 10 is a fragmentary sectional view taken along the line X—X of FIG. 9.
Figure 11:
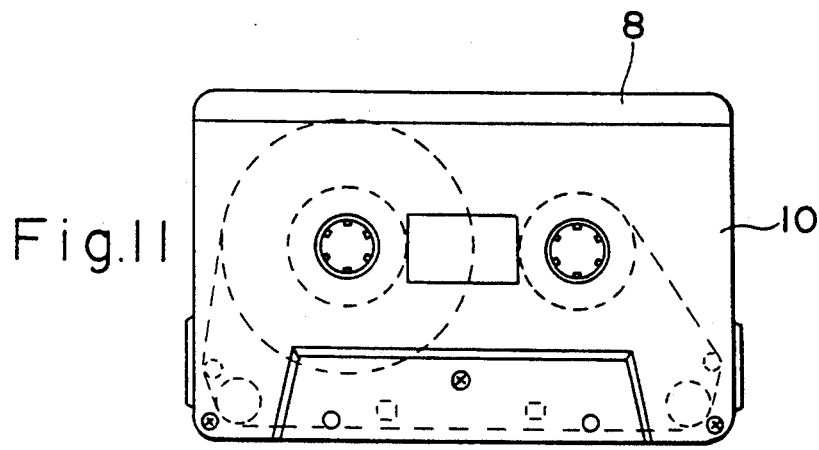
FIG. 11 is a front view of a half housing section of a conventional magnetic tape cassette, with the rear part formed independent of the cassette body as a separable member or rear frame member.
Figure 12:
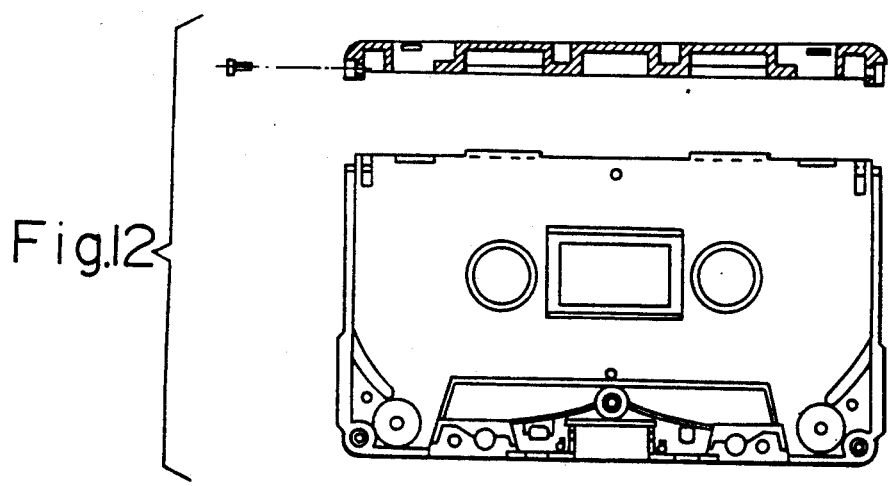
FIG. 12 is an exploded plan view of the conventional tape cassette shown in FIG. 11.
Figure 13:
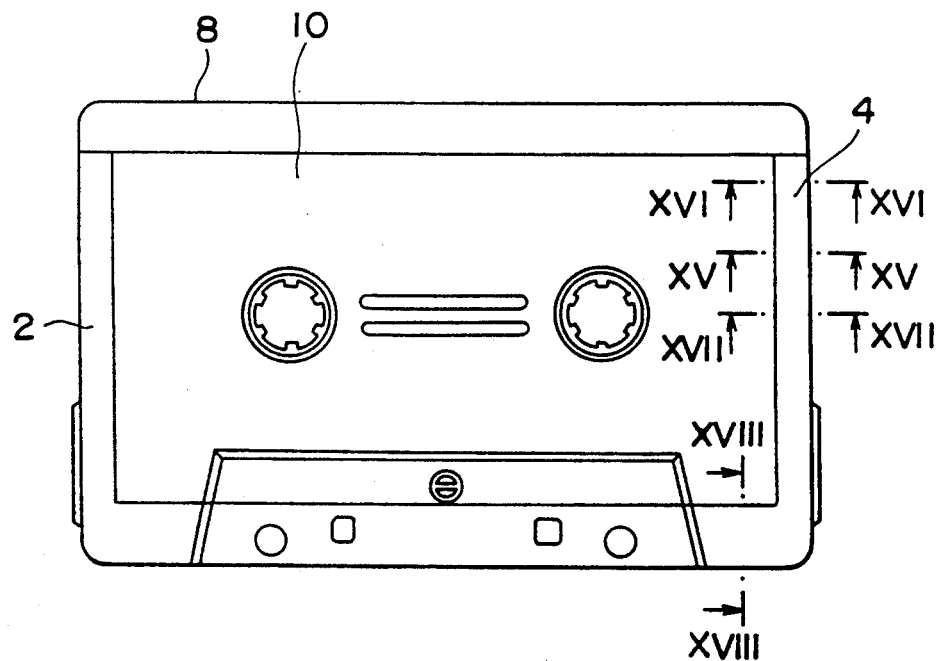
FIG. 13 is a plan view of the second embodiment of magnetic tape cassette of the invention.

The first embodiment of the invention will now be described in detail with reference to FIGS. 1 through 8.

Referring to FIG. 1, there is illustrated, in an exploded view, a magnetic tape cassette 6 including a pair of side frame members 2, 4 in accordance with the invention. The cassette has a rear frame member 8 which is formed with tape type detecting openings (not shown) fitted to the rear end of the cassette body. The part of the magnetic tape cassette extending from the front end of the edge adjoining the rear frame member constitutes the main body 10 of the cassette. The main body 10 is made up of upper and lower half housing sections to accommodate a pair of hubs on which a length of magnetic tape is wound and also tape guide rollers and the like (all not shown). The individual frame members are attached to the main body, typically by first fitting the both side frame members 2, 4 to the corresponding sides of the main body 10 and then fitting the rear frame member 8 to the rear end of the body 10. Fastener means such as screws 12, 14 are inserted, respectively, through holes formed in both sides of the rear frame member 8 and through holes formed in rear extensions 16, 18 of the side frame members 2, 4, into holes formed in the corresponding portions of the main body 10, and are tightened so as to secure the rear frame member 8 and the rear extensions of the side frame members 2, 4 to the body 10.

Front end portions 22, 24 of the side frame members may be partly bent, as shown in FIG. 1, to form front end portions of the magnetic tape cassette 6. Like the rear extensions 16, 18, the front end portions 22, 24 are fastened, respectively, by screws 26, 28 to the main body 10.

In accordance with the first embodiment so far described, the side wall portions of the magnetic tape cassette that come in direct contact with and are held by the tape holder of a recording-reproducing device are made of a pair of side frame members 2, 4 formed independently of the main body. Thus, the side frame members 2, 4 may be made of a material with a low coefficient of friction, while the main body 10 is built of a high friction coefficient material such as an elastomer, to ensure smooth release of the magnetic tape cassette from the holder.

The side frame members 2, 5 may also be made of a high rigidity material to maintain adequate rigidity of the magnetic tape cassette as a whole, even when the main body 10 is fabricated from a flexible material such as an elastomer. The cassette embodying the invention thus achieves a functional effect of better flexibility in design than the prior art products.

Now, in conjunction with FIGS. 13 to 18, the second embodiment of the invention, which is an improvement over the first, will be described in detail below.

Figure 14:
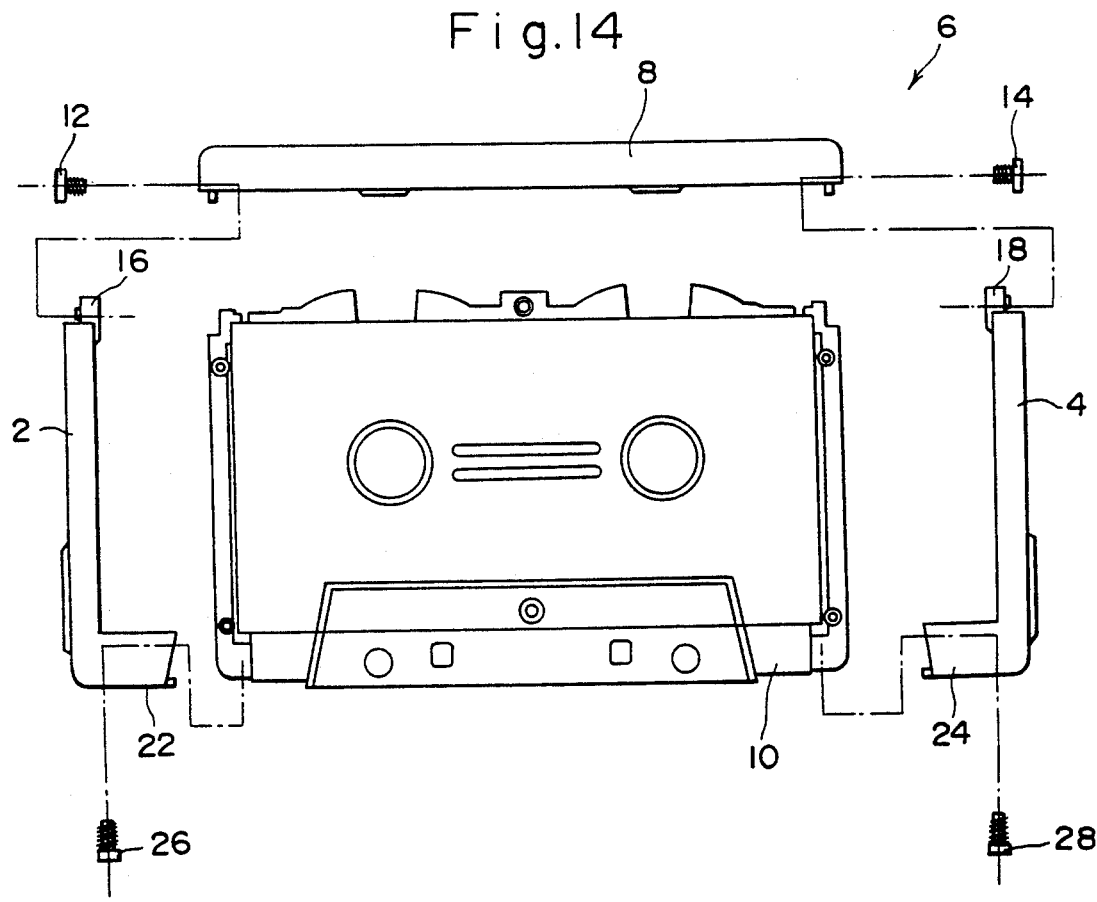
FIG. 14 is an exploded plan view of the same cassette.

In FIG. 14 there is shown a magnetic tape cassette 6, in an exploded view, a magnetic tape cassette 6 including a pair of side frame members 2, 4 embodying the invention. The components of the cassette 6 are the same as those in the first embodiment and are like numbered and the description omitted except for the characteristic portions now to be clarified.

Figure 17:
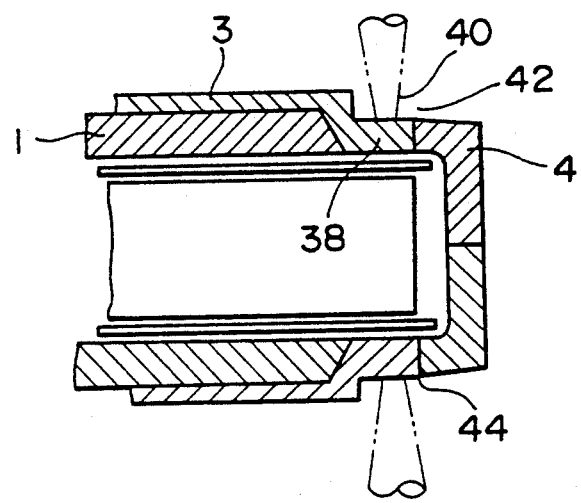
FIG. 17 is a fragmentary sectional view taken along the line XVII—XVII of FIG. 13.
Figure 18:
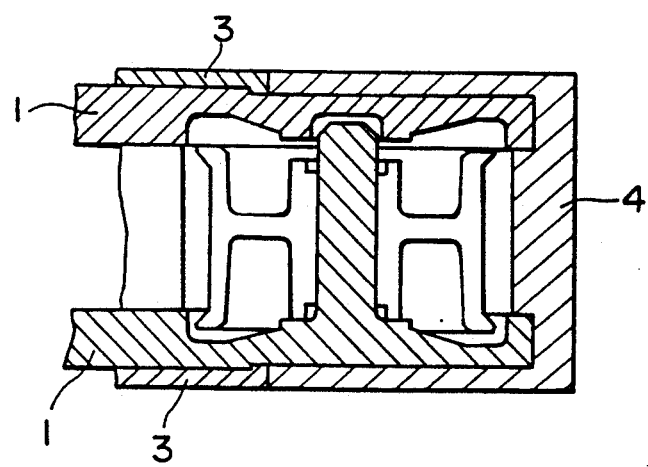
FIG. 18 is a fragmentary sectional view taken along the line XVIII—XVIII of FIG. 13.

With this embodiment, the upper and lower half housing sections that constitute the main body 10 (only the upper half housing section being shown in FIG. 13) are of double-layer structure, each section consisting of an inside layer 1 of a rigid material and an outside layer 3 of an elastomer or other flexible material. The inside layers 1 of the two housing sections are formed with grooves, as shown in FIG. 15, with steps 34, 36, respectively, along the portions mating with the edges of the side frame members 2, 4, e.g., the edges 30, 32 of the side frame member 4 which when engaged with the body 10 rest on the upper and lower half housing sections. On the other hand, the portions of the outside layers 3 overlying the steps are generally L-shaped in cross section as shown, as they are likewise stepped downward into the grooves and then extended a predetermined distance inwardly of the edges 30, 32 of each side frame member. In FIG. 17 are typically shown pouring basins 38 and pouring gates 40 in location for forming the outside layers. The pouring basins 38 are located in the regions where the outside layers 3 are extended to the L-shaped cross sections as shown, and the pouring gates 40 in the corresponding regions.

In the second embodiment the spaces above the outside layers 3 of the upper and lower half housing sections once occupies by the pouring gates are filled by the edges 30, 32 of the side frame members 2, 4. Consequently, fins 42, 44 formed at the time of molding on the extremities of the portions of the outside layers 3 L-shaped in cross section are covered up by the edges of the side frame members. The edges additionally hold the ends of the outside layers in place, precluding the outside layers from curling or being peeled away from the inside layers.

Referring now to FIG. 19 through 27, the third embodiment of the invention will be described in detail.

Figure 19:
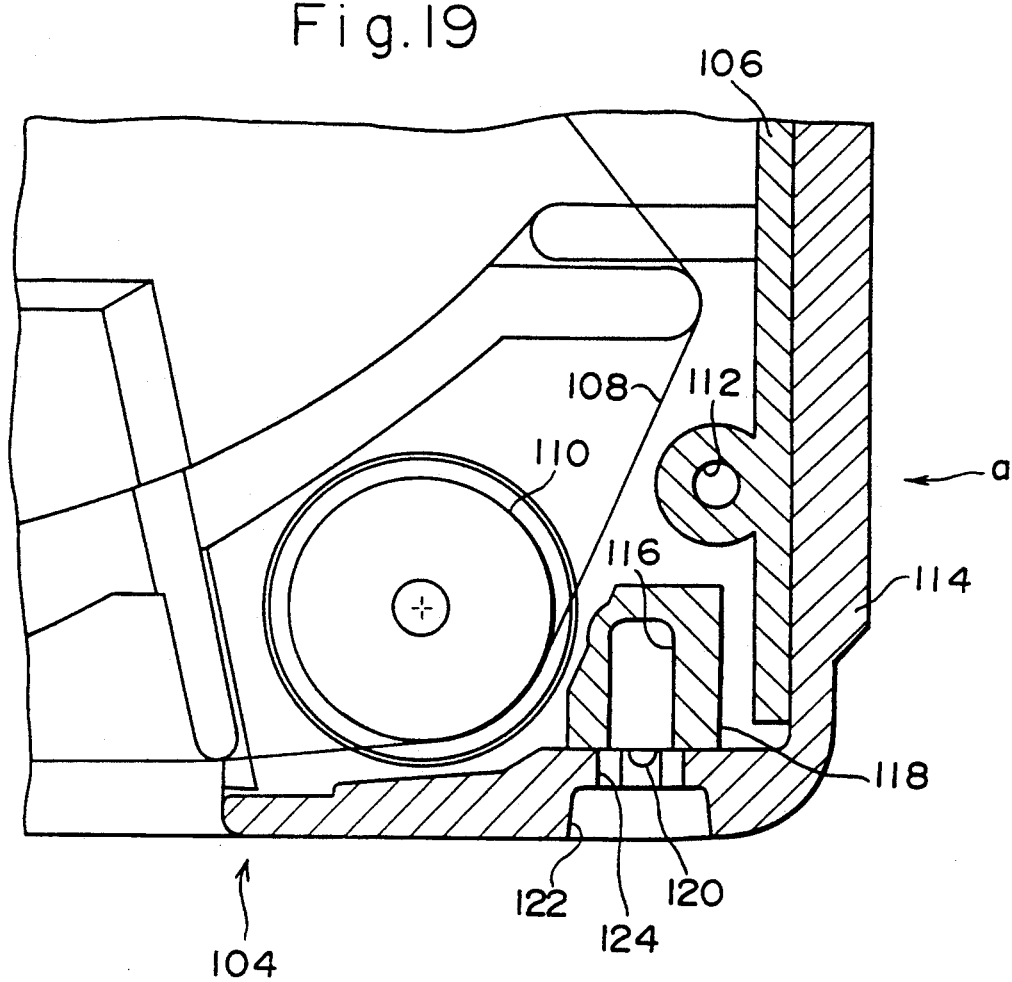
FIG. 19 is a fragmentary sectional plan view of a front corner of the third embodiment of magnetic tape cassette according to the invention.

Shown in FIG. 19 is a fragmentary section of a magnetic tape cassette incorporating temporary fastening means in accordance with the present invention. This magnetic tape cassette includes a rear frame member (indicated at 132 in FIG. 22) which has tape type detecting openings and is fitted to the rear end of the body. The part of the magnetic tape cassette extending from the front end 104 to the edge adjoining the rear frame member constitutes the main body 106 of the cassette. The main body 106 is made up of upper and lower half housing sections to accommodate a pair of tubs (not shown) on which a length of magnetic tape 108 is wound and also tape guide rollers 110 and the like. The upper and lower half housing sections are joined by inserting and fastening tapping screws or the like in holes 112 and the like. On other sides in the longitudinal direction of the main body 106 (only one side being shown in FIG. 19) a pair of side frame members 114 are press fitted in the directions of the arrows a.

Figure 20:
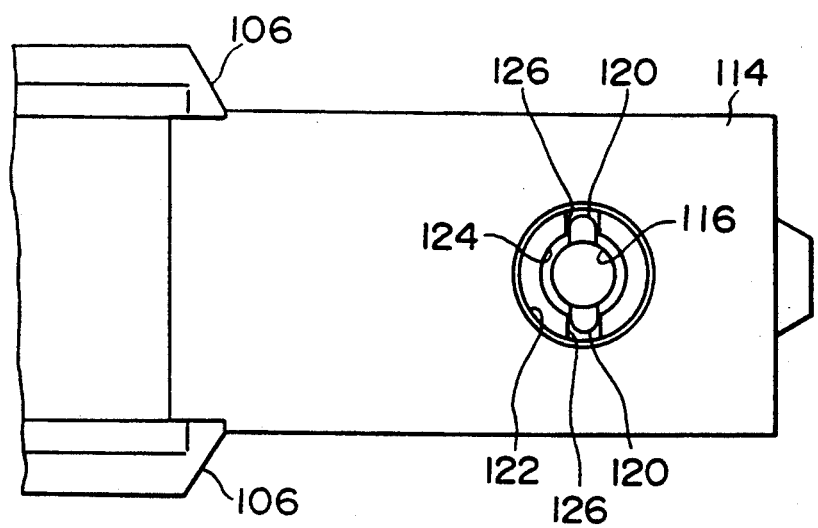
FIG. 20 is a front view of the front corner of the same cassette.

On each side in the longitudinal direction of the lower half housing section that constitutes the main body 106, at the front end of the magnetic tape cassette, there is provided a first fixing means (hole) for securing the side frame member 114 in place; i.e., a screw-receiving seat 118 formed with a hole 116 is formed in one piece with the lower housing section for thread engagement with a first tapping screw (not shown). Around the open end of the hole 116 of the screw-receiving seat 118, a pair of protuberances 120 are formed, as FIG. 20 shows, in the directions at right angles to the axis of the hole 116 and on the same plane. Accordingly, at the point of the side frame member 114 facing the hole 116, there are formed an opening 122 to accommodate the head of the tapping screw and a hole 124 slightly larger in diameter than the hole 116 and which opens at the bottom of the opening 122 and extends through the side frame member 114, both concentrically with the hole 116. The hole 124 is formed with axial slots 126 at points facing the protuberances 120. The height of the protuberances 120 is such that it provides no hindrance to the press fitting of the side frame member 114 in the direction of the arrow a.

Figure 21:
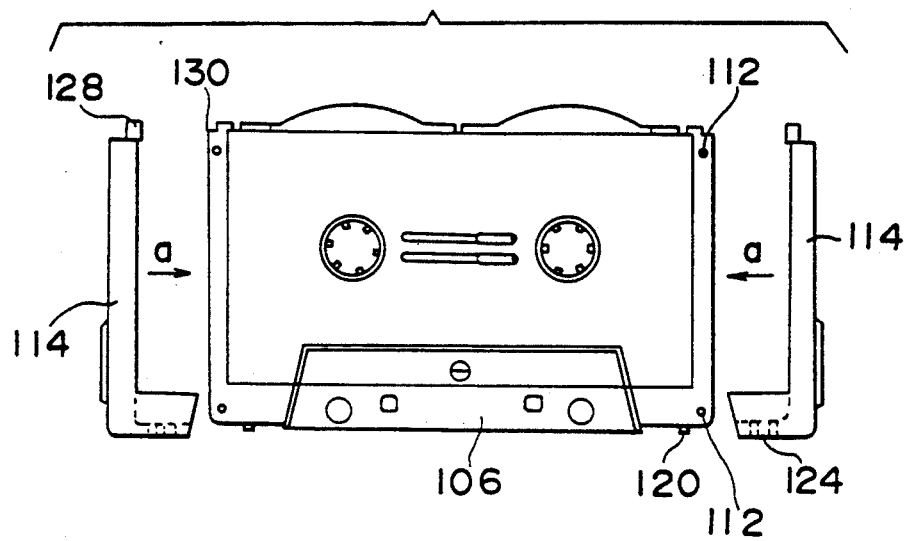
FIG. 21 is an exploded view of the same cassette in one stage of assembling.
Figure 22:
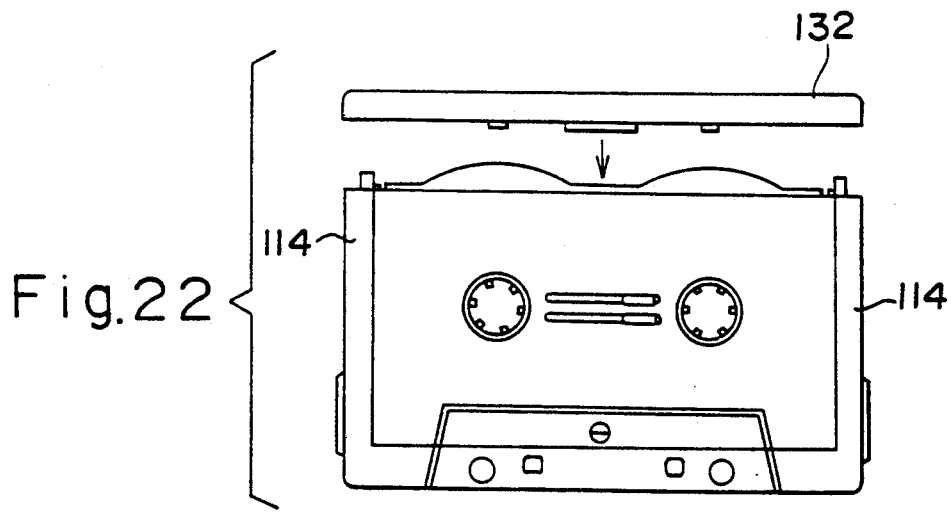
FIG. 22 is an exploded view of the same cassette in another stage of assembling.
Figure 23:
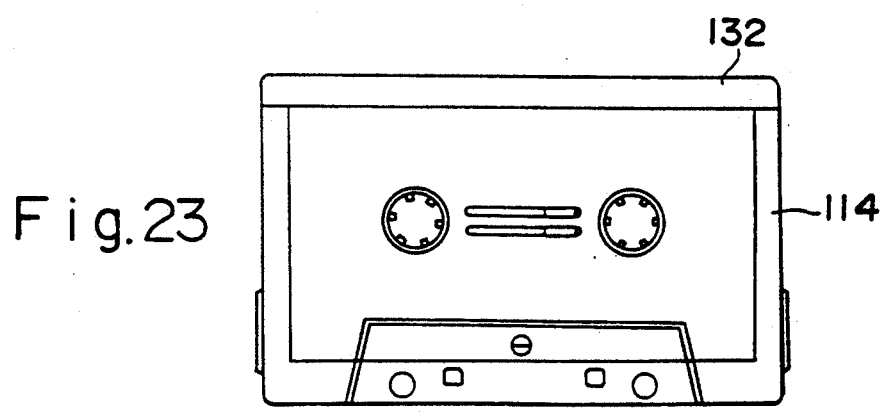
FIG. 23 is a plan view of the same cassette as assembled.
Figure 24:
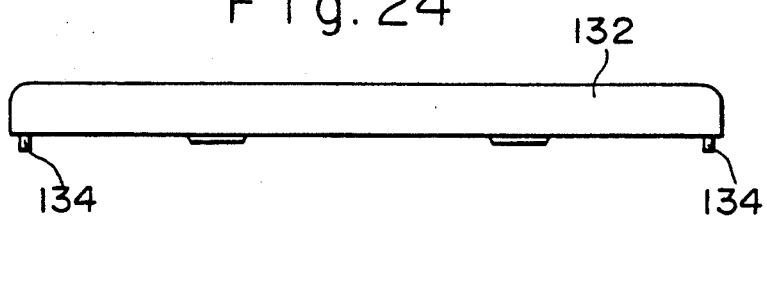
FIG. 24 is a plan view of the rear member of a modification of the third embodiment.
Figure 25:
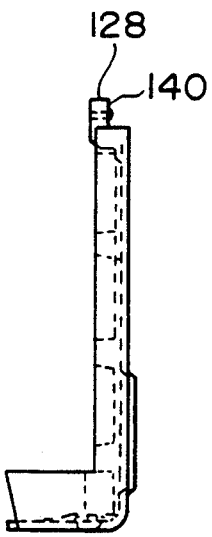
FIG. 25 is a plan view of a side frame member of the same modification.
Figures 26, 27:
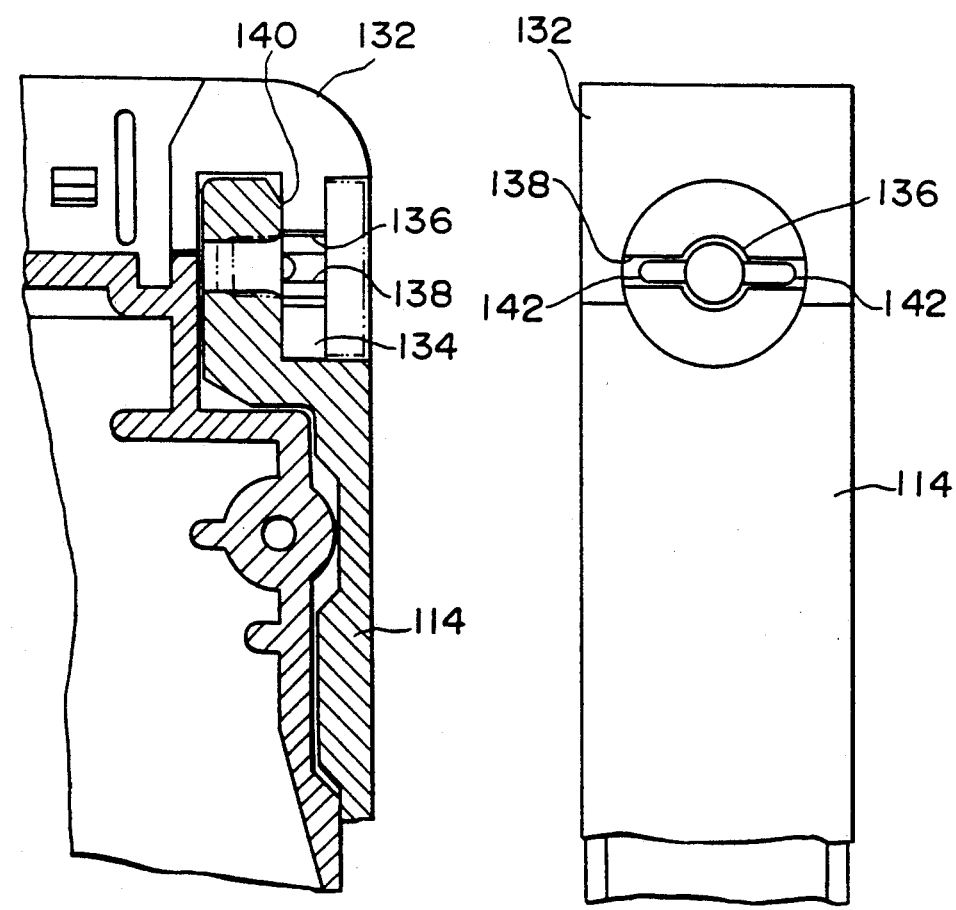
FIG. 26 is a fragmentary sectional plan view of the rear frame member of FIG. 24 and the side frame member of FIG. 25 as fitted integrally in a main body.
FIG. 27 is a right side view of the assembly in FIG. 26.

Assembling of the third embodiment of magnetic tape cassette with the construction described above will now be explained in connection with FIGS. 21 to 23. First, the upper and lower half housing sections are mated and joined at the plurality of holes 112 with tapping screws to form the main body 106. The pair of side frame members 114 then are press fitted in the directions of the arrows a to the both longitudinal sides of the main body 106. At this point, the lower portions of end extensions 128 of the side frame members 114 provided with the second fixing means, or second tapping screw holes (not shown), are engaged with rear corners 130, while the protuberances 120 on the screw-receiving seats 118 of the main body 106 resiliently fit in the holes 124. Next, as in FIG. 22, the rear frame member 132 are attached to the rear end of the body 106 and the ends of the both side frame members 114. The first and second tapping screws are driven into the corresponding holes for thread engagement, thus completing a magnetic tape cassette as shown in FIG. 23.

FIGS. 24 to 27 illustrate a modification of the third embodiment, in which the portions of the rear frame member 132 and side frame members 114 of the third embodiment where the second fixing means are used are provided with similar but modified means instead.

Here lugs 134 formed integrally on both sides longitudinally of the rear frame member 132 have each a hole 136 and a slot 138 to receive a second tapping screw similar to the one referred to above. Planar portions 140 of rear extensions 128 of the side frame members 114 which face the inner surface of the lugs 134 have protuberances 142 of shape and size and at location suited for engagement with the slots 138 to serve as interlocking temporary fastening means.

With the third embodiment, it is possible to temporarily fasten the side frame members in position by simply pressing them against desired portions of the main body. This facilitates the assembling operation involving attachment of the side frame members to the body using tapping screws. The assembling is even more facilitated by providing similar temporary fastening means at points of the side and rear frame members corresponding to the second fixing means.

The fourth embodiment of the invention will be explained below in conjunction with FIGS. 28 to 29a. The magnetic tape cassette 202 comprises upper and lower half housing sections like conventional cassettes, and each half housing section has a double-layer structure of inside layer 204 and outside layer 206. In the space defined between the two half housing sections are contained a length of tape and hubs on which the tape is wound, with guides for guiding the tape provided in the front region of the housing (the components being not shown). The upper and lower half housing sections are molded in the following way. First, a plastic material of chosen type which becomes rigid on solidification is injected into the cavity of an inside layer-forming mold (not shown), thus forming a primary or inside layer 204 by injection molding. Then, a chosen thermoplastic elastomeric material, e.g., polyurethane elastomer, is injected into the cavity space between the outer surface of the injection molded inside layer and an outside layer-forming mold (not shown) to form a secondary or outside layer 206 by injection molding, thus completing a double-layer structure. The inside layer-forming mold to be used is such that, in producing the inside layer 204, it makes the outer surface 208 mirror smooth with a surface roughness Rz of less than one micron, preferably less than 0.5 $\mu$m. On the other hand, the outside layer-forming mold to be used produces the outside layer 206 having a stain crape outer surface 210 with a surface roughness Rz from 0.5 to 50 $\mu$m, preferably 3 $\mu$m or upwards. After the invention molding of the secondary side with the individual molds, an interface 208 of high mirror-to-mirror interfacial adherence is formed on the secondary side, i.e., between the outside layer 206 and the inside layer 204. Between the outside layer 206 and the inner surface of the outside layer-forming mold is formed an interface 210 of low satin-to-satin interfacial adherence. When the molded part is ejected after the molding of the secondary side, the interfacial adherence of the interface 208 greater than that of the interface 210 effectively prevents the outside layer 206 from sticking to the secondary side mold and thereby precludes interfacial separation of the inside and outside layers.

With this fourth embodiment, the adherence in the interface between the surface of the outside layer-forming mold and the corresponding surface of the outside layer so produced is less than when the both surfaces are mirror finished. This produces the functional effect of preventing the aforesaid interfacial separation of the inside and outside layers.

The fifth embodiment of the invention will now be described in detail with reference to FIGS. 32 to 36.

Figure 32:
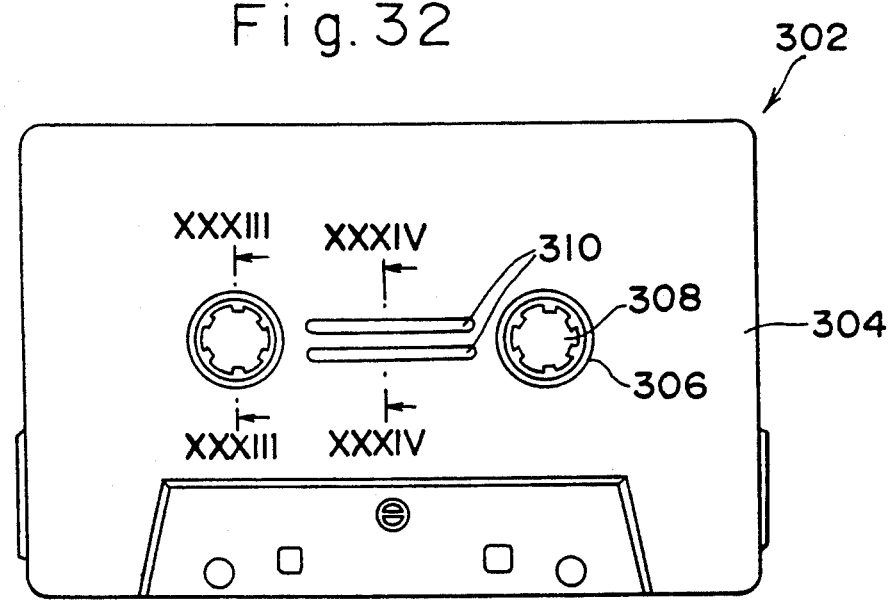
FIG. 32 is a front view of the fifth embodiment of magnetic tape cassette of the invention.

FIG. 32 shows a magnetic tape cassette embodying the invention. The magnetic tape cassette 302 has tape type detecting openings (not shown) formed at the rear end and has a region at the front where guide rollers and tape guides (not shown) for guiding a magnetic tape are provided. Upper and lower half housing sections (only the upper half section 304 being shown) have a pair of hubs on which a length of magnetic tape is wound, each hub opening having an outer tapered rim 306. The upper half housing section 304 is formed with tape-view windows 310 approximately in its center.

Figure 34:
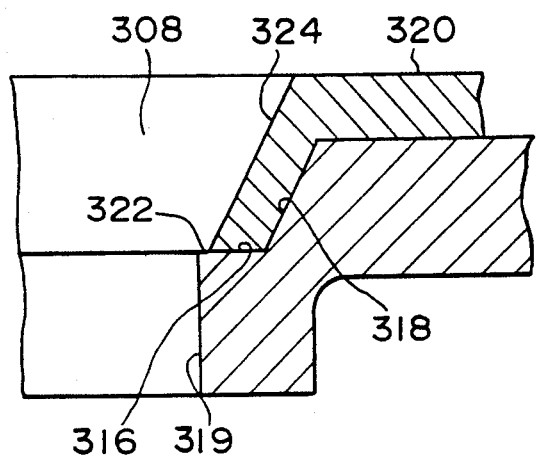
FIG. 34 is a fragmentary enlarged sectional view of the encircled portion in FIG. 33.
Figure 33:
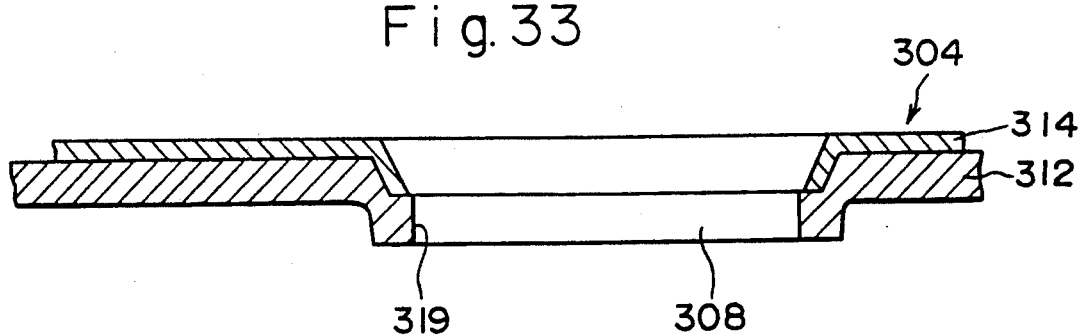
FIG. 33 is a fragmentary sectional view taken along the line XXXIII—XXXIII of FIG. 32.
Figure 38:
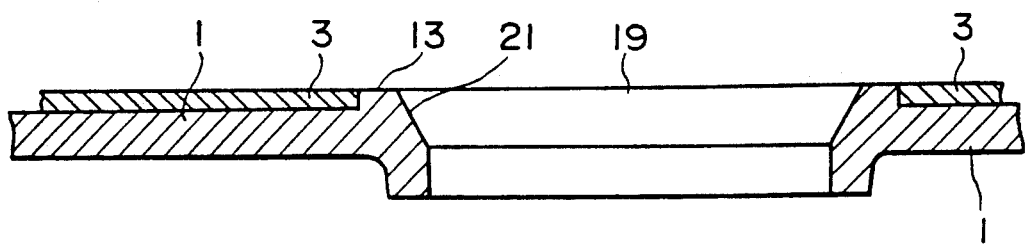
FIG. 38 is a fragmentary sectional view taken along the line XXXVIII—XXXVIII of FIG. 37.

According to this invention the upper and lower half housing sections are of double-layer structure, having inside and outside layers bonded together. FIG. 33 shows, in cross section, one of the hub openings 308 and the surrounding portion of the upper half housing section. As shown, the upper half section 304 consists of an inside layer 312 such as of a plastic material and an outside layer 314 such as of an elastomeric material. In this embodiment the raised rim 313 of the conventional hub openings as shown in FIG. 38 is not formed. The portion of the inside layer 312 equivalent to the conventional tapered portion around the hub opening that serves as a guide for the insertion of the hub driving shaft of a recording-reproducing device is formed stepwise, as shown in FIG. 34, consisting of an annular planar rim 316 adjacent to the center hole 319 and a tapered rim which rises from the outer periphery of the annular planar rim 316.

The outside layer 314 is formed as joined to the outer surface of the inside layer 312. In the portion around the hub opening 308, it extends downward along the tapered rim 318 as shown and ends where it abuts on most part of the annular planar rim 316. The outer surface 320 of the outside layer 314 is usually satin crape finished or knurled to improve the appearance, diversify the design, and, moreover, impart a non-slip effect. The remainder of the annular rim 316 exposed close to the center hole 319 form a narrow step or offset 322 with a depth between zero and 0.3 mm, which prevents sagging during molding of the outside layer 314 and undesirable finning which can result from the sagging. In this embodiment the outer surface of the inside layer 312 that comes in contact with the outside layer is mirror finished as heretofore, except for the offset 322 which is satin finished like the outside layer. This eliminates mirror reflection from the offset 322 and makes the offset inconspicuous. It further improves the outward appearance of the magnetic tape cassette, with greater surface structural or design integrity of the offset 322 and the tapered rim 324 of the outside layer 314.

Figure 36:
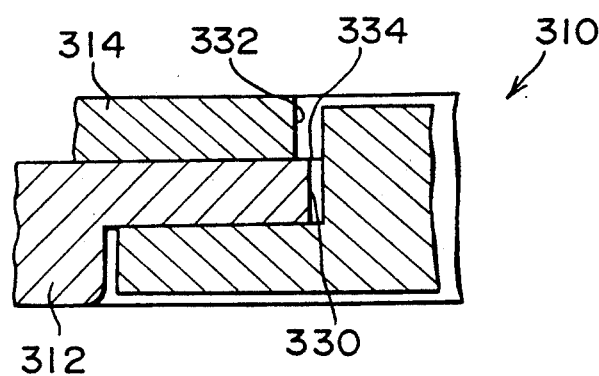
FIG. 36 is a fragmentary enlarged sectional view of the encircled portion in FIG. 35.
Figure 35:
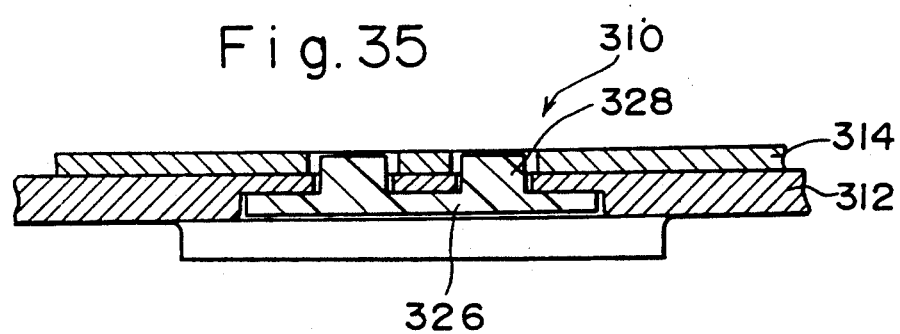
FIG. 35 is a fragmentary sectional view taken along the line XXXIV—XXXIV of FIG. 32.
Figure 37:
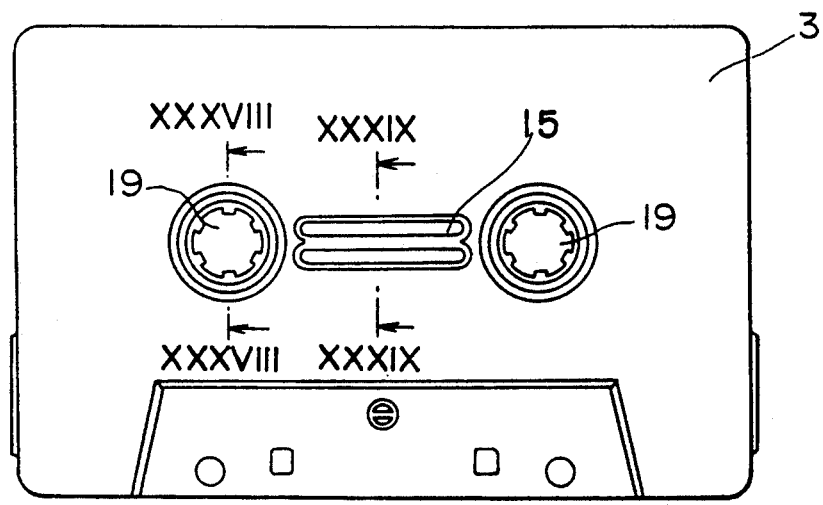
FIG. 37 is a plan view of a conventional magnetic tape cassette.
Figure 39:
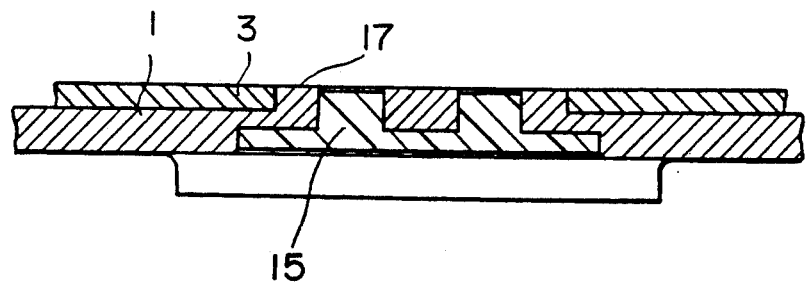
FIG. 39 is a fragmentary sectional view taken along the line XXXIX—XXXIX of FIG. 37.

In the magnetic tape cassette of the invention, window offsets similar to the offsets 322 are formed around the tape-view windows. Referring to FIGS. 35 and 36, the inside layer 312 is simply formed with slots 330 to receive lands 328 of a window member 326 in the tape-view windows 310. No such raised rim as at 17 in the conventional arrangement of FIG. 39 is formed. In the portion of the outside layer 314 corresponding to the slots 330, there are formed broader slots 332, with the rims receding from the rims of the sots 330. In this way annular steps 334 similar to the aforesaid offsets 322 are formed between the rims of the slots 330 of the inside layer 312 and those of the slots 332 so as to avoid sagging at the time of molding of the outside layer. In this embodiment the annular steps 334 too are knurled or otherwise irregularly finished on the surface like the outer surface of the outside layer 314 to improve the appearance of the tape cassette.

The fifth embodiment of the invention thus far described, in which the outside layer is extended into hub openings along their tapered rims and the offsets are satin crape finished, enhances the surface structural integrity of the outside layer and adds aethetic value to the magnetic tape cassette.

While the invention has been described with reference to preferred embodiments thereof, it is to be understood that various changes and modifications may be made in the invention without departing from the spirit and scope thereof.

What is claimed is:

1. A magnetic tape cassette comprising;
   a pair of hubs on which a length of magnetic tape is wound;
   a housing including a main body consisting of rectangular upper and lower half housing sections of double-layer structure each consisting of inside and outside layers, said main body having a front end where tape guide rollers and tape guides are installed and a rear end and a pair of lateral ends, said hubs being mounted in said housing;
   a rear frame member attached to the rear end of the main body opposite to the front end and having safety lug openings and tape-type detecting openings formed therein,
   a pair of side frame members each having an inner surface are attached to the lateral ends of the main body, each said side frame member also has an outer surface capable of directly contacting a holder for a recording-reproducing device,
   wherein said inside layers of the upper and lower half housing sections adjacent the lateral ends are formed with steps, and
   wherein the outside layers are formed to fall onto the steps, said inner surface of the side frame members engaging the outside layer against the inside layer adjacent the steps.

2. A magnetic tape cassette comprising upper and lower half housing sections, a pair of hubs on which a length of magnetic tape is wound and contained between said upper and lower half housing sections, each of said upper and lower half housing sections being formed with a pair of hub openings each having an outer tapered rim and a center hole to receive a hub, said upper and lower half housing sections being of a double-layer structure consisting integrally of inside and outside layers, the region which surrounds each hub opening consisting of a portion of said inside layer having a tapered rim parallel to the outer tapered rim and an annular planar rim formed between the center hole and the tapered rim and an outside layer portion which extends downward along the tapered rim and the annular planar rim of the inside layer, leaving an annular offset exposed close to the center hole, the interface between the inside and outside layers and the region surrounding each hub opening being mirror finished, whereas the surface of the annular offset exposed around the center hole of the hub opening is satin crepe finished.

3. A magnetic tape cassette comprising upper and lower half housing sections, a pair of hubs on which a length of magnetic tape is wound and contained between said upper and lower half housing sections, each of said upper and lower half housing sections being formed with a pair of hub openings each having an outer tapered rim and a center hole to receive a hub, said upper and lower half housing sections being of a double-layer structure consisting integrally of inside and outside layers and each includes a tape-view window opening, the rims adjacent said tape-view window opening in the outside layer receding relative to the rims of said tape-view window openings in the inside layer thereby exposing a surface of the inside layer to form offsets of the outside layer, the exposed surface of the offsets being satin crepe finished, whereas the surface of the inside layer that comes in contact with the outside layer, except for the offsets around the tape-view window openings, is mirror finished.

* * * * *